United States Patent
Feng et al.

(10) Patent No.: US 10,895,451 B2
(45) Date of Patent: Jan. 19, 2021

(54) STRUCTURED LIGHT BASED WHEEL MULTIPLE PARAMETER ONLINE MEASUREMENT SYSTEM AND MEASUREMENT METHOD THEREOF

(71) Applicant: DONGGUAN NANNAR ELECTRONICS TECHNOLOGY CO., LTD., Guangdong (CN)

(72) Inventors: Qibo Feng, Guangdong (CN); Hui Dong, Guangdong (CN); Fajia Zheng, Guangdong (CN); Shuangyun Shao, Guangdong (CN); Zhizhong Tan, Guangdong (CN); Xiaohua Zhao, Guangdong (CN)

(73) Assignee: DONGGUAN NANNAR ELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/469,752

(22) PCT Filed: Aug. 23, 2017

(86) PCT No.: PCT/CN2017/098573
§ 371 (c)(1),
(2) Date: Jun. 14, 2019

(87) PCT Pub. No.: WO2019/024147
PCT Pub. Date: Feb. 7, 2019

(65) Prior Publication Data
US 2020/0149879 A1   May 14, 2020

(30) Foreign Application Priority Data
Aug. 3, 2017 (CN) .......................... 2017 1 0657356

(51) Int. Cl.
*G01B 11/25* (2006.01)
*G01B 11/10* (2006.01)
(Continued)

(52) U.S. Cl.
CPC ............ *G01B 11/2513* (2013.01); *B61K 9/12* (2013.01); *G01B 11/02* (2013.01); *G01B 11/105* (2013.01);
(Continued)

(58) Field of Classification Search
CPC ... G01B 11/2513; G01B 11/02; G01B 11/105; G01B 11/245; B61K 9/12; H04N 5/2253;
(Continued)

(56) References Cited

U.S. PATENT DOCUMENTS 4,531,837 A * 7/1985 Panetti ............... G01B 11/2518
356/608
4,798,963 A * 1/1989 Wittkopp ............... G01B 11/08
250/559.22
(Continued)

*Primary Examiner* — Isiaka O Akanbi
(74) *Attorney, Agent, or Firm* — Demian K. Jackson; Jackson IPG PLLC

(57) ABSTRACT

The invention relates to an online measurement system and method for multiple parameters of a wheel based on structured light. The measurement system comprises a wheel sensor, a first wheel online measurement device and a second wheel online measurement device, and is characterized in that both the first wheel online measurement device and the second wheel online measurement device comprise a tread structured light unit, a profile structured light unit and a two-dimensional image sensor. The tread structured light unit and the profile structured light unit project a profile contour curve and a tread contour curve on the wheel, the two-dimensional image sensor takes images, three-dimensional reconstruction is performed on the images to obtain tread contour information and profile contour information, and the wheel diameter, the wheel flange height and the
(Continued)

wheel flange thickness are acquired according to the obtained contour information.

2 Claims, 10 Drawing Sheets

(51) Int. Cl.
*B61K 9/12* (2006.01)
*G01B 11/02* (2006.01)
*G01B 11/245* (2006.01)
*G01N 21/95* (2006.01)
*G06T 7/00* (2017.01)
*H04N 5/225* (2006.01)

(52) U.S. Cl.
CPC ....... *G01B 11/245* (2013.01); *G01N 21/9515* (2013.01); *G06T 7/0002* (2013.01); *G06T 2207/10028* (2013.01); *G06T 2207/30252* (2013.01); *H04N 5/2253* (2013.01)

(58) Field of Classification Search
CPC .............. G01N 21/9515; G06T 7/0002; G06T 2207/10028; G06T 2207/30252
USPC .................................................. 356/601–630
See application file for complete search history.

(56) References Cited

U.S. PATENT DOCUMENTS

| | | | |
|---|---|---|---|
| 5,619,587 A * | 4/1997 | Willoughby, Jr. | B21C 51/00 356/630 |
| 5,808,906 A * | 9/1998 | Sanchez-Revuelta | G01B 11/25 702/151 |
| 2004/0095585 A1* | 5/2004 | Nayebi | G01B 11/245 356/601 |
| 2016/0282108 A1* | 9/2016 | Martinod Restrepo | G01M 17/013 |

* cited by examiner

STRUCTURED LIGHT BASED WHEEL MULTIPLE PARAMETER ONLINE MEASUREMENT SYSTEM AND MEASUREMENT METHOD THEREOF

FIELD OF THE INVENTION

The present invention relates to a wheel online measurement system and method, and in particular to an online measurement system and method for multiple parameters of a wheel based on structured light.

BACKGROUND OF THE INVENTION

When wheels of a train pass through a curve or a turnout, wheel rim portions rub against inner side surfaces of rails to cause rim abrasion. In addition, during the running of the train, wheel treads often cause local abrasion due to braking or idling. The tread abrasion and the rim abrasion may cause changes in the outer dimensions of the wheel, which greatly affects ride comfort and operational stability. When the abrasion of the wheel exceeds a certain limit, there is a hidden danger that causes a major traffic accident. Therefore, the outer dimensions of the wheels are an important indicator for measuring a technical state of a wheel set.

At present, a model is generally used to visually inspect the wheel size in China, or a special wheel rim size measuring gage is used to perform manual measurement. These detection modes need to accurately position a wheel during the measurement process, and have the disadvantages of inefficiency, poor reliability, low measurement accuracy, and long locomotive turnaround time, which cannot be overcome by static detection, and cannot truly provide reliable information for repair of subway train wheel sets, and cannot know the quality of the wheel in operation in a timely manner, so it is inevitable that the wheel with excessive abrasion is still in use, and there is a hidden danger of driving safety. In addition, the existing detection technology uses image analysis to determine the wheel set deformation, and the technical solution is easily interfered by ambient light and cannot reach the state of working around the clock.

SUMMARY OF THE INVENTION

In view of this, an object of the present invention is to provide an online measurement system and method for multiple parameters of a wheel based on structured light, intended to solve the problems of poor reliability and low measurement accuracy of a current wheel online measurement system.

To achieve the above object, the present invention mainly adopts the following technical solutions:

An online measurement system for multiple parameters of a wheel based on structured light may include a system controller, a wheel sensor, a first wheel online measurement device, and a second wheel online measurement device. The wheel sensor, the first wheel online measurement device and the second wheel online measurement device may be all connected to the system controller. The wheel sensor, the first wheel online measurement device and the second wheel online measurement device may be sequentially disposed side by side in a train forward direction.

Both the first wheel online measurement device and the second wheel online measurement device may include a tread structured light unit, a profile structured light unit and a two-dimensional image sensor, the profile structured light unit, the tread structured light unit and the two-dimensional image sensor being arranged along the outer side of the same steel rail.

The tread structured light unit may emit n line lasers, where $n \geq 2$, and when the n line lasers are projected onto a wheel, n wheel tread contour curves may be formed. The profile structured light unit may emit m line lasers, where $m \geq 1$, and when the m line lasers are projected onto the wheel, m wheel profile contour curves may be formed. The m wheel profile contour curves may intersect with the n wheel tread contour curves in an area where a tread contour line is spaced apart from an inner side surface by 60-80 mm. The n wheel tread contour curves and the m wheel profile contour curves may be all within an imaging range of the two-dimensional image sensor.

Further, the line laser may be emitted by a laser emission device, the laser emission device may include a line laser light source, a beam splitter and a mirror, and the beam splitter and the mirror may divide the line laser light source into a plurality of line lasers with a specific angle relationship.

Further, the line laser may be emitted by a laser emission device, the laser emission device may include a line laser light source and a binary optical beam splitter, and the binary optical beam splitter may divide the line laser light source into a plurality of line lasers with a specific angle relationship.

Further, the line laser may be emitted by a laser emission device, the laser emission device may include a plurality of line laser light sources, and the plurality of line laser light sources may be installed in a specific angle and emits a plurality of line lasers forming a certain angle relationship.

Further, the quantity of line lasers emitted by the profile structured light unit of the first wheel online measurement device may be equal to the quantity of line lasers emitted by the profile structured light unit of the second wheel online measurement device, and each pair of corresponding line lasers may be projected onto the same wheel profile circle.

An online measurement method for multiple parameters of a wheel based on structured light may include the following steps:

first step, installation and calibration:

(1) the online measurement system for multiple parameters of a wheel based on structured light is installed on a detection section;

(2) structured light parameters are calibrated;

second step, train wheel parameter detection:

(1) obtaining measured train wheel contour information: when the train passes, after a wheel sensor detects a wheel, a first wheel online measurement device and a second wheel online measurement device are operated simultaneously, profile contours of m line lasers of profile structured light units of the first and second wheel online measurement devices on the wheel are denoted as $lp_{1-2}$, $lp_{1-m}$, $lp_{2-1}$, $lp_{2-2}$, ..., $lp_{2-m}$, tread contours of $n_1$ line lasers of a tread structured light unit of the first wheel online measurement device on the wheel are denoted as $lt_{1-1}$, $lt_{1-2}$, ..., $lt_{1-n1}$, respectively, tread contours of $n_2$ line lasers of a tread structured light unit of the second wheel online measurement device on the wheel are denoted as $lt_{2-1}$, $lt_{2-2}$, $lt_{2-n2}$, respectively, and two two-dimensional image sensors respectively take contour images $P_{1-1}$ and $P_{2-1}$, $P_{1-2}$ and $P_{2-2}$, ..., $P_{1-k}$ and $P_{2-k}$ of two segments of profile structured light and tread structured light at the bottoms of k groups of wheels at k times, where k is a natural number;

(2) reconstructing a first group of three-dimensional contour images: three-dimensional image reconstruction is performed on $P_{1-1}$ and $P_{2-1}$ according to images $P_{1-1}$ and $P_{2-1}$ taken by a first group of two two-dimensional image sensors and the structured light parameters calibrated in (2) of the first step to obtain three-dimensional reconstructed tread structured light contours $lt'_{1-1}, lt'_{1-2}, \ldots, lt'_{1-n1}, lt'_{2-2}, \ldots, lt'_{2-n2}$ and three-dimensional reconstructed profile structured light contours $lp'_{1-1}, lp'_{1-2}, \ldots, lp'_{1-m}, lp'_{2-1}, lp'_{2-2}, \ldots, lp'_{2-m}$;

(3) calculating a first group of measured wheel contour parameters: a first group of three-dimensional reconstructed tread structured light contours $lt'_{1-1}, lt'_{1-2}, \ldots, lt'_{1-n1}, lt'_{2-1}, lt'_{2-2}, \ldots, lt'_{2-n2}$ is processed to synthesize a wheel tread curve lt', and a first group of wheel rim height and rim thickness is calculated by definition according to the tread curve lt'; or all $n_1+n_2$ reconstructed tread contours are separately processed to obtain $n_1+n_2$ wheel rim height and rim thickness values, the rim height and rim thickness values with large errors are eliminated, the remaining wheel rim height and rim thickness values are averaged, and the first group of wheel rim height and rim thickness is calculated;

(4) calculating a first group of measured wheel diameters: m circles $C_1, C_2, \ldots, C_m$ are fitted according to m pairs of profile structured light contours $lp'_{1-1}$ and $lp'_{2-1}, lp'_{1-2}$ and $lp'_{2-2}, \ldots, lp'_{1-m}$ and $lp'_{2-m}$ after the first group of three-dimensional images is reconstructed, m diameters $D_1, D_2, \ldots, D_m$ are obtained according to a fitted circle equation, the m fitted circle diameters $D_1, D_2, \ldots, D_m$ are corrected to a rolling circle according to the contour curve lt' to obtain m rolling circle diameter values $D_1', D_2', \ldots, D_m'$, the rolling circle diameter values with large errors are eliminated, and then averaging is performed to obtain a first group of wheel diameter values D;

(5) when k is greater than 1, steps (2) to (4) are repeated for the remaining k−1 groups of images $P_{1-2}$ and $P_{2-2}, \ldots, P_{1-k}$ and $P_{2-k}$, k−1 groups of wheel rim height, rim thickness and diameter values are calculated, the values with large errors are eliminated for k groups of wheel rim height, rim thickness and diameter values, and then averaging is performed to obtain final measured wheel rim height, rim thickness and diameter values;

(6) tread abrasion and peeling recognition: when there is no abrasion or peeling on a wheel set, all the profile structured light contours after the three-dimensional image reconstruction at k times are continuously slowly changing arcs, and when one of the profile structured light contours is abruptly changed, abrasion or peeling is judged depending on the type of abrupt change; and third step, real-time judgment alarm: differences are solved by comparing the wheel diameter, rim height and rim thickness values measured in the second step with standard values; it is judged whether an alarm prompt is required according to the diameter difference, the rim height difference and the rim thickness difference; it is judged whether an alarm prompt is required according to whether there is abrasion or peeling; when all the parameters do not exceed set values and there is no abrasion or peeling, it is considered that it is safe; and when one or more parameters exceed the set values or there is abrasion or peeling, it is determined that a system has a hidden danger, and an alarm prompt is given.

Further, in the first step, the detection section may be provided with a plurality of online measurement systems for multiple parameters of a wheel based on structured light, when the train passes through a detection area, the plurality of online measurement systems for multiple parameters of a wheel based on structured light may sequentially take images from different areas of the wheel, and after the wheel is rolled in the detection area for one circle, three-dimensional reconstruction and image stitching may be performed on pictures of the plurality of online measurement systems for multiple parameters of a wheel based on structured light to obtain a complete train wheel contour.

The present invention has the beneficial effects that: the tread structured light unit and the profile structured light unit project a wheel profile contour and a tread contour on the wheel, two two-dimensional detectors take two images and perform three-dimensional reconstruction to obtain corresponding two parts of wheel tread and profile contour information, and wheel diameter, rim height and rim thickness can be obtained according to the two images. By taking multiple images by two or more two-dimensional image sensors, system reliability and measurement accuracy can be improved. A line laser is actively projected to form the wheel profile contour and the tread contour, which is less affected by the ambient light. The wheel diameter is solved according to two profile structured light contour fitting circles on the same circle, so that precise positioning for the wheel is not required.

DETAILED DESCRIPTION OF THE PREFERRED EMBODIMENTS

In order to make the technical solutions of the present invention more clearly shown, the present invention will be further described below with reference to the accompanying drawings.

First Embodiment

Figure 1:
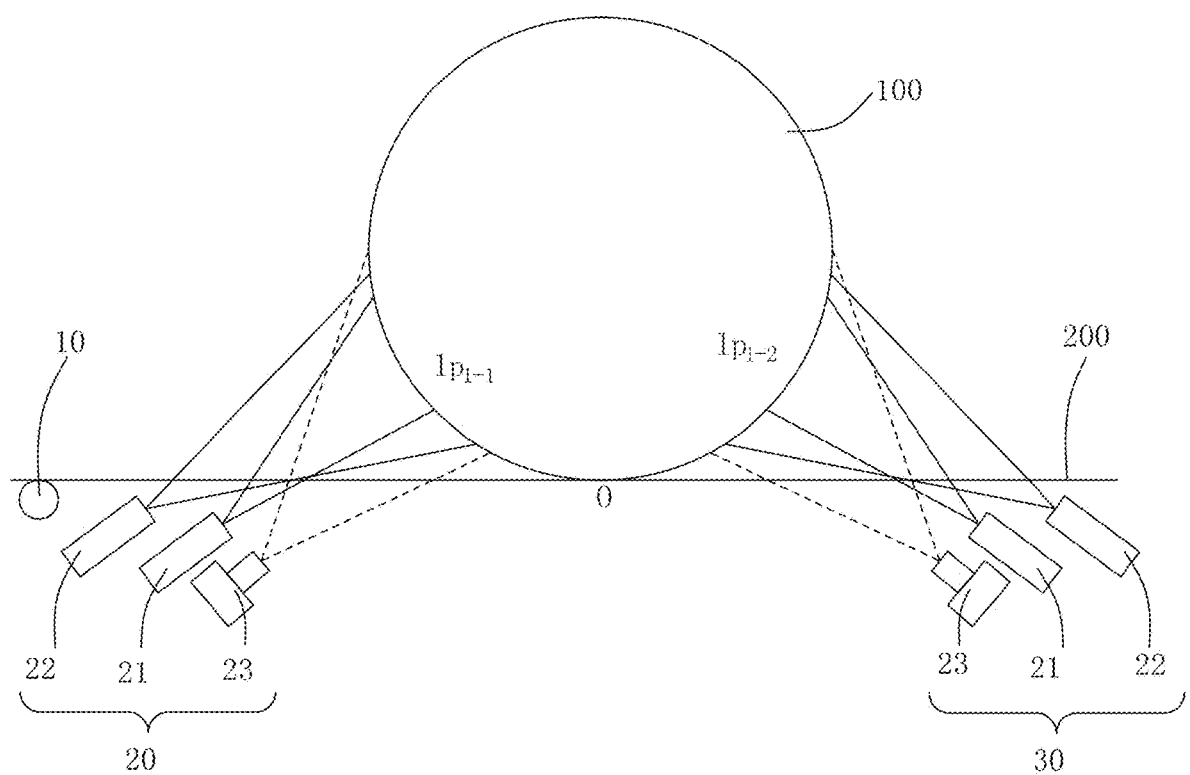
FIG. 1 is a composition diagram of a first embodiment of an online measurement system for multiple parameters of a wheel based on structured light according to the present invention.
Figure 2:
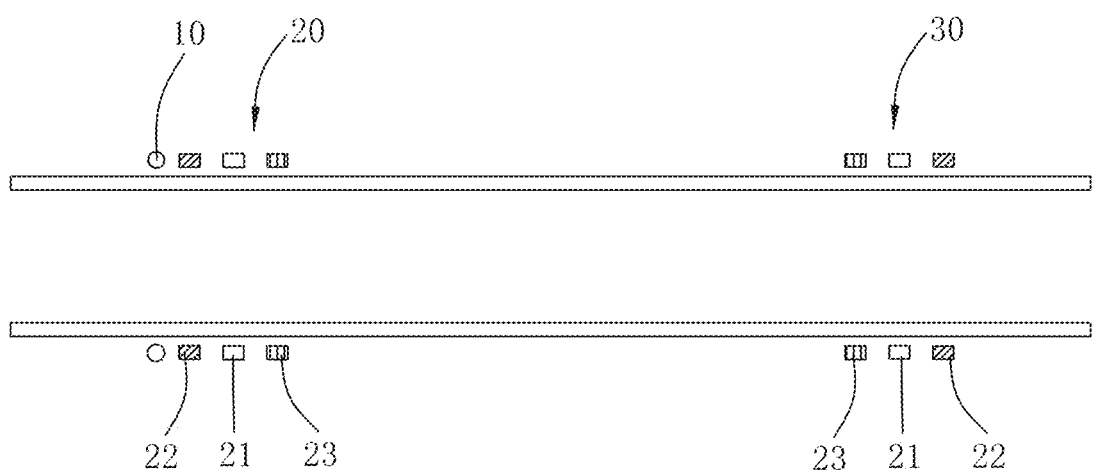
FIG. 2 is a distribution diagram of the online measurement system for multiple parameters of a wheel based on structured light shown in FIG. 1.
Figure 3:
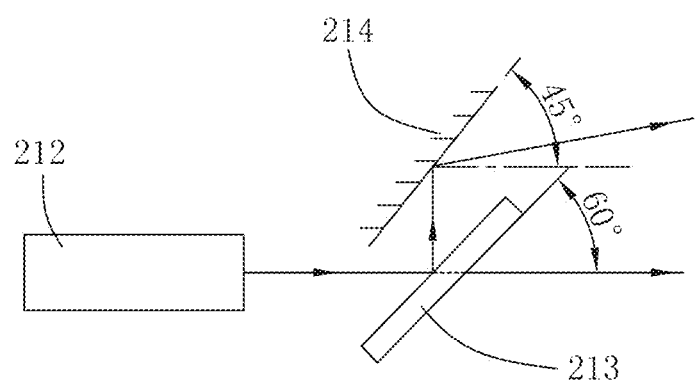
FIG. 3 is a composition mode diagram of a laser line of a tread structured light unit in FIG. 1.
Figure 4:
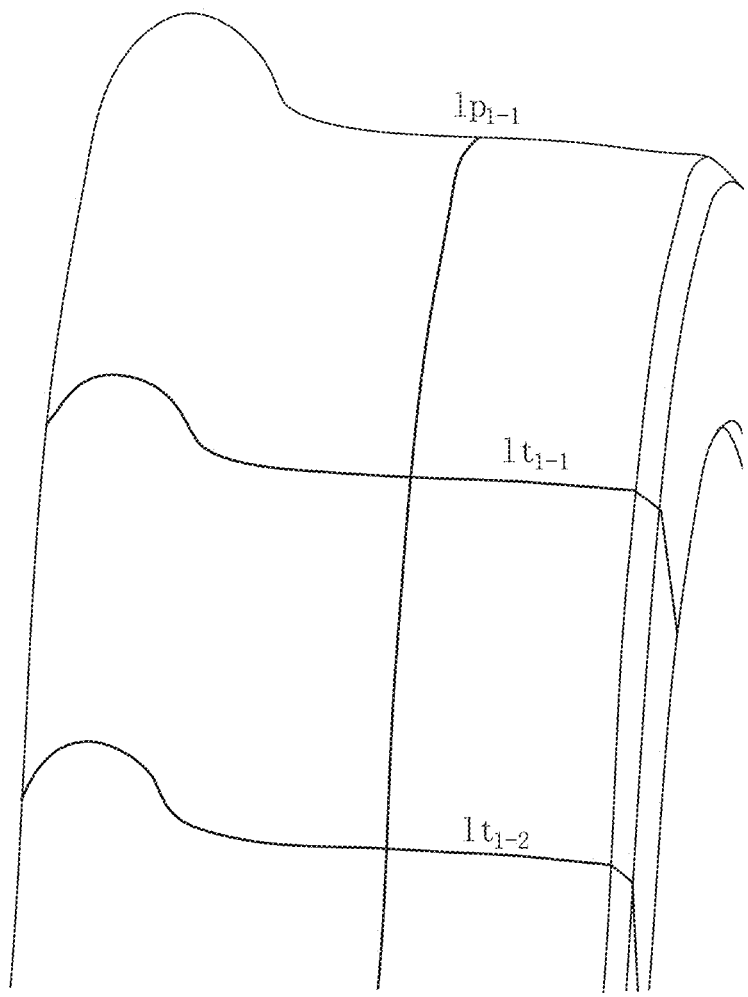
FIG. 4 is a structure diagram of a profile contour curve and two tread contour curves of a first wheel online measurement device in FIG. 1.
Figure 5:
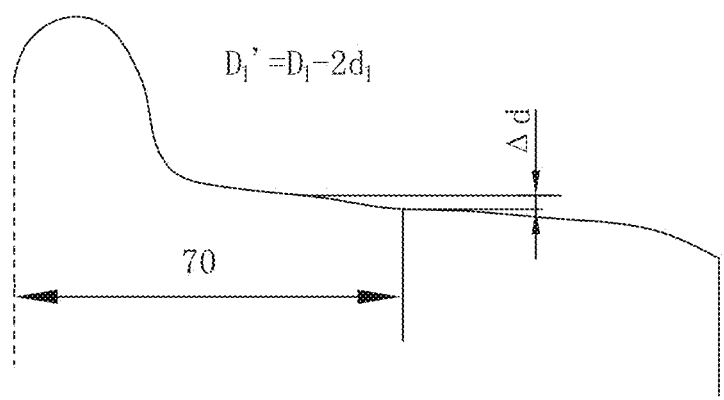
FIG. 5 is a schematic diagram of correcting a fitted circle diameter $D_1$ to a rolling circle in a first embodiment of the present invention.

As shown in FIG. 1 to FIG. 5, it is a first embodiment of an online measurement system for multiple parameters of a wheel based on structured light provided by the present invention. The online measurement system for multiple parameters of a wheel based on structured light includes a system controller (not shown), a wheel sensor 10, a first wheel online measurement device 20, and a second wheel online measurement device 30. The wheel sensor 10, the first wheel online measurement device 20 and the second wheel online measurement device 30 are sequentially disposed side by side in a train forward direction.

The wheel sensor 10, the first wheel online measurement device 20 and the second wheel online measurement device 30 are all connected to the system controller. The midpoint of the first wheel online measurement device 20 and the second wheel online measurement device 30 is Point O. In the present embodiment, the first wheel online measurement device 20 and the second wheel online measurement device 30 are mirror-symmetrical with respect to a plane perpendicular to a steel rail 200 at Point O. It will be appreciated that the first wheel online measurement device 20 and the second wheel online measurement device 30 may also be asymmetrically arranged.

Both the first wheel online measurement device 20 and the second wheel online measurement device 30 include a tread structured light unit 21, a profile structured light unit 22 and a two-dimensional image sensor 23, the profile structured light unit 22, the tread structured light unit 21 and the two-dimensional image sensor 23 being arranged along the outer side of the same steel rail. But the order of the three components can be reversed. The quantity of line lasers emitted by the profile structured light unit 22 of the first wheel online measurement device 20 is equal to the quantity of line lasers emitted by the profile structured light unit 22 of the second wheel online measurement device 20, and each pair of corresponding line lasers is projected onto a profile circle of the same wheel.

The tread structured light unit 21 may emit n line lasers, where n≥2. In the present embodiment, the tread structured light unit 21 emits two line lasers. The position and direction of the tread structured light unit 21 are adjusted, such that two planes formed by the two line lasers are perpendicular to the inner side surface of the wheel 100, and when two line lasers of the two tread structured light units 21 are projected onto the wheel 100, wheel tread contour curves $lt_{1-1}$ and $lt_{1-2}$ are formed respectively. The two line lasers in the tread structured light unit 21 are emitted by a laser emission device including a line laser light source 211, one or more beam splitters 212, and a mirror 213. An angle between the beam splitter 212 and a line laser outgoing plane is 60°, and an angle between the mirror 213 and the line laser outgoing plane is 45°. Light emitted by the line laser light source 211 passes through the beam splitter 212 and the mirror 213, and forms two line lasers perpendicular to the inner side surface of the wheel 100 at an angle of 30°.

The profile structured light unit 22 may emit m line lasers, where m≥1. In the present embodiment, the profile structured light unit 22 emits a line laser, that is, m=1. The position and direction of the profile structured light unit 22 are adjusted such that: (1) a plane formed by the line laser of the profile structured light unit 22 is perpendicular to a horizontal plane, and an angle between the optical axis of the line laser and the horizontal plane is 0, where 0°<θ≤60'; (2) a line laser of the profile structured light unit is projected onto the wheel to form a wheel profile contour curve $lp_{1-1}$; and (3) the wheel profile contour curve $lp_{1-1}$ intersects with the wheel tread contour curves $lt_{1-1}$ and $lt_{1-2}$ at a slowly changing area spaced from the inner side surface of the tread contour line by 60 to 80 mm.

The position and direction of the two-dimensional image sensor 23 are adjusted such that the measurement range covers all wheel tread contour curves and wheel profile contour curves projected by the profile structured light unit 22 and the tread structured light unit 21 on the wheel, so both the wheel tread profile contour curve and the wheel profile contour curve can be imaged on the two-dimensional image sensor 23.

In the present embodiment, a measurement method of the online measurement system for multiple parameters of a wheel based on structured light includes the following steps:

first step, installation and calibration:

(1) the online measurement system for multiple parameters of a wheel based on structured light is installed on a detection section;

(2) structured light parameters are calibrated;

second step, train wheel parameter detection:

(1) obtaining measured train wheel contour information: when the train passes, after the wheel sensor 10 detects a wheel, the first wheel online measurement device 20 and the second wheel online measurement device 30 are operated simultaneously, profile contours of a line laser of the profile structured light units 22 of the first wheel online measurement device 20 and the second wheel online measurement device 30 on the wheel are denoted as $lp_{1-1}$ and $lp_{1-2}$, tread contours of two line lasers of the tread structured light unit 21 of the first wheel online measurement device 30 on the wheel are denoted as $lt_{1-1}$ and $lt_{1-2}$, respectively, tread contours of two line lasers of the tread structured light unit 21 of the second wheel online measurement device 30 on the wheel are denoted as $lt_{2-1}$ and $lt_{2-2}$, respectively, and two two-dimensional image sensors 23 respectively take images $P_{1-1}$ and $P_{2-1}$ of two profile contours and tread contours at the bottoms of a group of wheels;

(2) reconstructing three-dimensional contour images: three-dimensional image reconstruction is performed on $P_{1-1}$ and $P_{2-1}$ according to the images $P_{1-1}$ and $P_{2-1}$ taken by two two-dimensional image sensors 40 and structured light parameters calibrated in (2) of the first step to obtain three-dimensional reconstructed tread structured light contours $lt'_{1-1}$, $lt'_{1-2}$, $lt'_{2-1}$, and $lt'_{2-2}$, and three-dimensional reconstructed profile structured light contours $lp'_{1-1}$ and $lp'_{2-1}$;

(3) calculating measured wheel contour parameters: the three-dimensional reconstructed tread structured light contours $lt'_{1-1}$, $lt'_{1-2}$, $lt'_{2-1}$, and $lt'_{2-2}$ are processed to synthesize a wheel tread curve lt', and a first group of wheel rim height and rim thickness is calculated by definition according to the tread curve lt'; or all four reconstructed tread contours are separately processed to obtain four wheel rim height and rim thickness values, the rim height and rim thickness values with large errors are eliminated, the remaining wheel rim height and rim thickness values are averaged, and the first group of wheel rim height and rim thickness is calculated;

(4) calculating measured wheel diameters: a circle $C_1$ is fitted according to a pair of profile structured light contours $lp'_{1-1}$ and $lp'_{2-1}$ after the three-dimensional images are reconstructed, and a diameter $D_1$ is obtained according to a fitted circle equation; the fitted circle diameter $D_1$ is corrected to a rolling circle according to the contour curve lt' to obtain a rolling circle diameter value $D_1'=D_1-2\Delta d$, that is, a wheel diameter value $D=D_1'$;

(5) tread abrasion and peeling recognition: when there is no abrasion or peeling on a wheel set, setting all the profile structured light contours after the three-dimensional image reconstruction to be continuously slowly changing arcs, and when one of the profile structured light contours is abruptly changed, judging abrasion or peeling depending on the type of abrupt change; and third step, real-time judgment alarm: differences are solved by comparing the wheel diameter, rim height and rim thickness values measured in the second step with standard values; it is judged whether an alarm prompt is required according to the diameter difference, the rim height difference and the rim thickness difference; it is judged whether an alarm prompt is required according to whether there is abrasion or peeling; when all the parameters do not exceed set values and there is no abrasion or peeling, it is considered that it is safe; and when one or more parameters exceed the set values or there is abrasion or peeling, it is determined that a system has a hidden danger, and an alarm is given.

Second Embodiment

Figure 6:
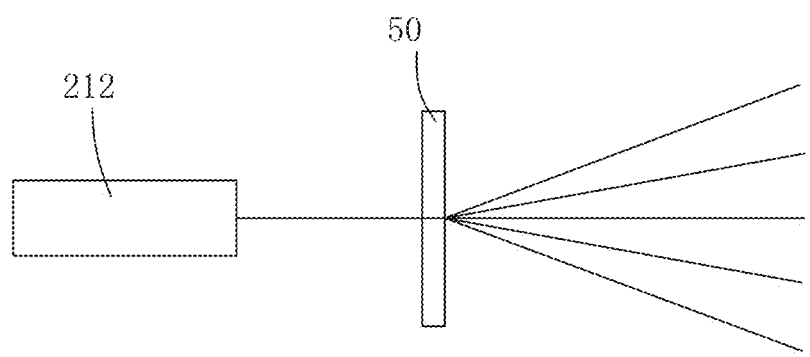
FIG. 6 is a composition mode diagram of five line lasers of a profile structured light unit in a second embodiment of the present invention.
Figure 7:
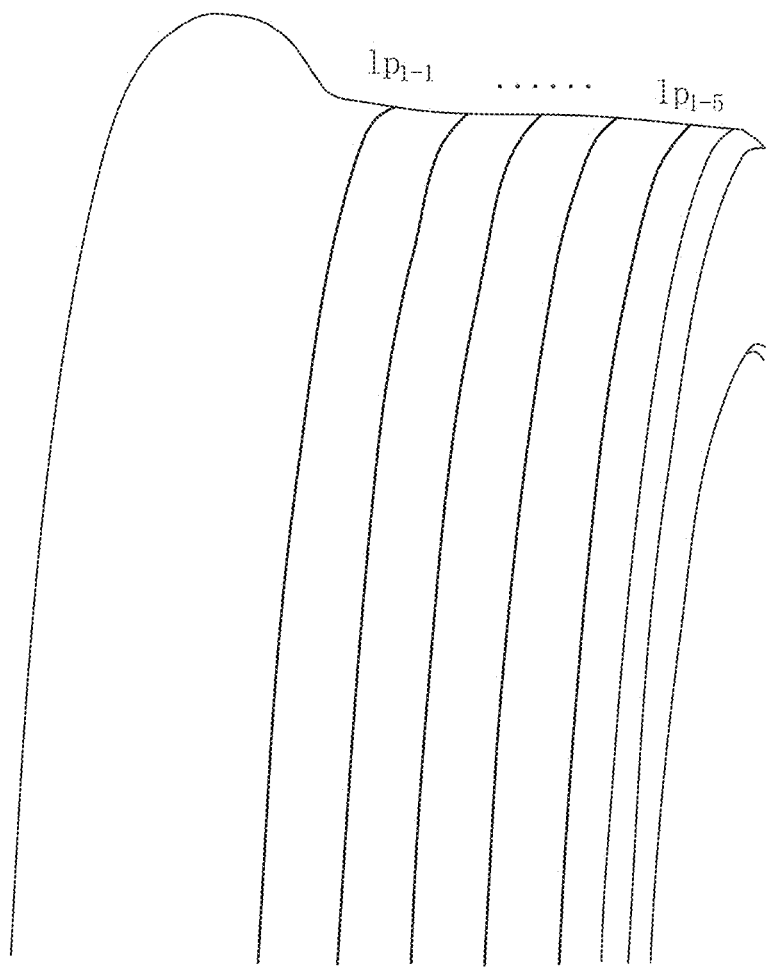
FIG. 7 is a structure diagram of five wheel profile contour curves formed when a line laser of a profile structured light unit is projected onto a wheel in a second embodiment of the present invention.
Figure 8:
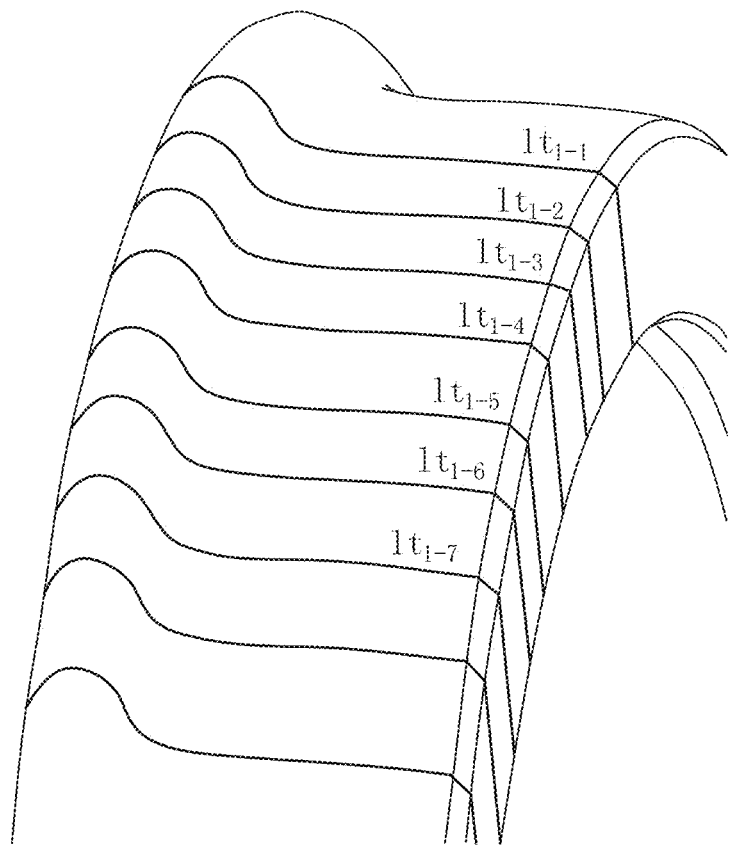
FIG. 8 is a structure diagram of nine wheel profile contour curves formed when a line laser of a tread structured light unit is projected onto a wheel in a second embodiment of the present invention.
Figure 9:
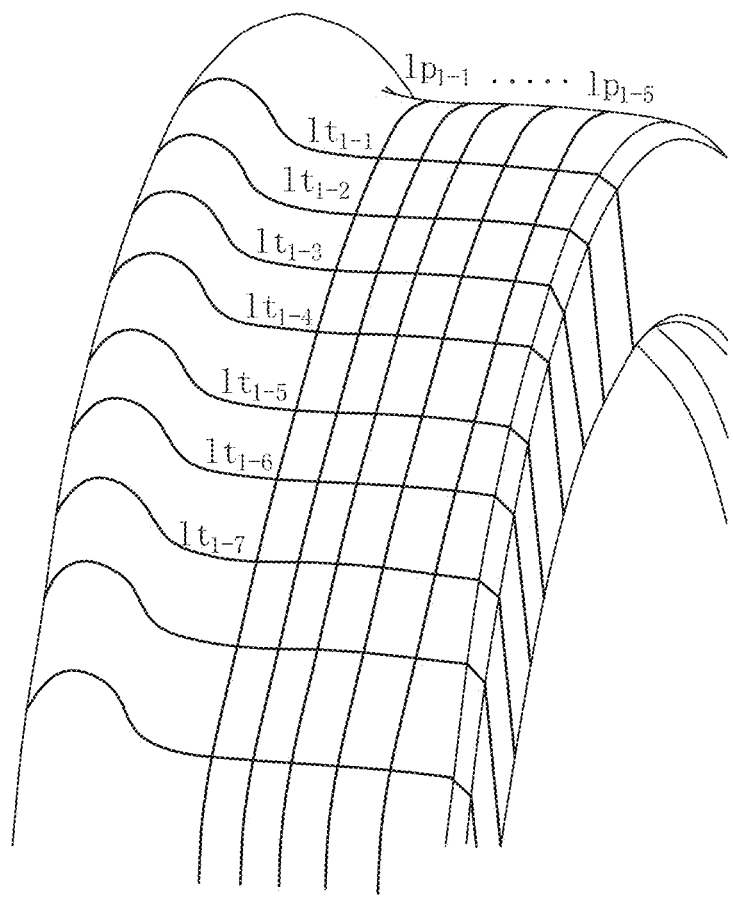
FIG. 9 is a structure diagram of five wheel profile contour curves and nine wheel profile contour curves formed when a line laser of a profile structured light unit and a line laser of a tread structured light unit are projected onto a wheel simultaneously in a second embodiment of the present invention.
Figure 10:
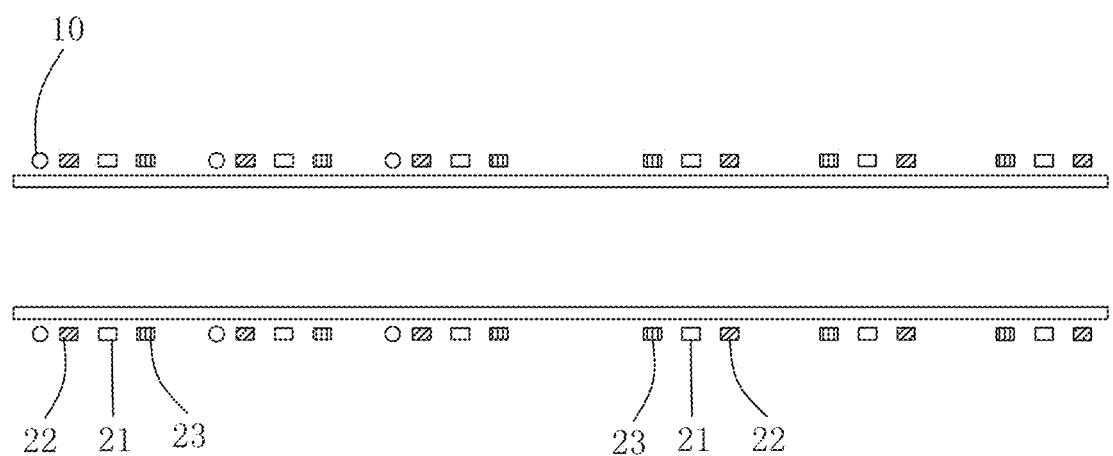
FIG. 10 is a distribution diagram of a plurality of online measurement systems for multiple parameters of a wheel based on structured light provided in the first embodiment and the second embodiment of the present invention.

As shown in FIG. 6 to FIG. 10, it is a second embodiment of an online measurement system for multiple parameters of a wheel based on structured light provided by the present invention. The online measurement system for multiple parameters of a wheel based on structured light of the present embodiment is substantially the same as that of the first embodiment, and also includes a system controller (not shown), a wheel sensor 10, a first wheel online measurement device 20, and a second wheel online measurement device 30. Both the first wheel online measurement device 20 and the second wheel online measurement device 30 include a tread structured light unit 21, a profile structured light unit 22 and a two-dimensional image sensor 23. The tread structured light unit 21, the profile structured light unit 22 and the two-dimensional image sensor 23 are arranged along the same steel rail 200. The order can be reversed.

The difference between the present embodiment and the first embodiment is that the profile structured light unit 22 in the present embodiment emits five line lasers, and the tread structured light unit 21 emits nine line lasers. The nine line lasers emitted by the tread structured light unit 21 and the five line light sources emitted by the profile structured light unit 22 are each emitted by a laser emission device. The laser emission device includes a line laser light source 212 and a binary optical beam splitter 50. The line laser light source 212 of the tread structured light unit 21 is split by the binary optical beam splitter 50, and the line laser light source 212 is split into nine line lasers having a specific angle relationship and perpendicular to the same plane. The line laser light source of the profile structured light unit 22 is split by the binary optical beam splitter 50, and the line laser light source is split into five line lasers having a specific angle relationship and perpendicular to the same plane.

The position and direction of the tread structured light unit 21 are adjusted, such that nine planes formed by the nine line lasers are perpendicular to the inner side surface of the wheel 100, and when the nine line lasers are projected onto the wheel 100, nine wheel tread contour curves are formed. The position and direction of the profile structured light unit 22 are adjusted such that: (1) five planes formed by all the five line lasers are perpendicular to a horizontal plane, and an angle between the optical axis of all the five line lasers and the horizontal plane is $\theta$, where $0°<\theta\le 60°$; (2) the five line lasers are projected onto the wheel to form five wheel profile contour curves; and (3) the five wheel profile contour curves intersect with the nine wheel tread contour curves at a slowly changing area of the tread contour line.

A measurement method of the online measurement system for multiple parameters of a wheel based on structured light of the present embodiment includes the following steps:

first step, installation and calibration:

(1) the online measurement system device for multiple parameters of a wheel based on structured light is installed on a detection section;

(2) structured light parameters are calibrated;

second step, train wheel parameter detection:

(1) obtaining measured train wheel contour information: when the train passes, after the wheel sensor detects a wheel, the first wheel online measurement device 20 and the second wheel online measurement device 30 are operated simultaneously, profile contours of nine line lasers of the profile structured light units 22 of the first wheel online measurement device 20 and the second wheel online measurement device 30 on the wheel are denoted as $lp_{1-1}$, $lp_{1-2}$, ..., $lp_{1-9}$, $lp_{2-1}$, $lp_{2-2}$, ..., $lp_{2-9}$, respectively, tread contours of five line lasers of the tread structured light unit of the first wheel online measurement device 20 on the wheel are denoted as $lt_{1-1}$, $lt_{1-2}$, ..., $lt_{1-5}$, respectively, tread contours of five line lasers of the tread structured light unit 21 of the second wheel online measurement device 30 on the wheel are denoted as $lt_{2-1}$, $lt_{2-2}$, ..., $lt_{2-5}$, respectively, and two two-dimensional image sensors 23 respectively take contour images $P_{1-1}$ and $P_{2-1}$, $P_{1-2}$ and $P_{2-2}$, and $P_{1-3}$ and $P_{2-3}$ of two segments of profile structured light and tread structured light at the bottoms of three groups of wheels at three times;

(2) reconstructing a first group of three-dimensional contour images: three-dimensional image reconstruction is performed on $P_{1-1}$ and $P_{2-1}$ according to images $P_{1-1}$ and $P_{2-1}$ taken by a first group of two two-dimensional image sensors 23 and the structured light parameters calibrated in (2) of the first step to obtain three-dimensional reconstructed tread structured light contours $lt'_{1-1}$, $lt'_{1-2}$, ..., $lt'_{1-5}$, $lt'_{2-1}$, $lt'_{2-2}$, ..., $lt'_{2-5}$ and three-dimensional reconstructed profile structured light contours $lp'_{1-1}$, $lp'_{1-2}$, ..., $lp'_{1-9}$, $lp'_{2-1}$, $lp'_{2-2}$, ..., $lp'_{2-9}$;

(3) calculating a first group of measured wheel contour parameters: a first group of three-dimensional reconstructed tread structured light contours $lt'_{1-1}$, $lt'_{1-2}$, ..., $lt'_{1-5}$, $lt'_{2-1}$, $lt'_{2-2}$, ..., $lt'_{2-5}$ is processed to synthesize a wheel tread curve lt', and a first group of wheel rim height and rim thickness is calculated by definition according to the tread curve lt'; or all ten reconstructed tread contours are separately processed to obtain ten wheel rim height and rim thickness values, the rim height and rim thickness values with large errors are eliminated, the remaining wheel rim height and rim thickness values are averaged, and the first group of wheel rim height and rim thickness is calculated;

(4) calculating a first group of measured wheel diameters: nine circles $C_1$, $C_2$, ..., $C_9$ are fitted according to nine pairs of profile structured light contours $lp'_{1-1}$ and $lp'_{2-1}$, $lp'_{1-2}$ and $lp'_{2-2}$, ..., $lp'_{1-9}$ and $lp'_{2-9}$ after the first group of three-dimensional images is reconstructed, nine diameters $D_1$, $D_2$, ..., $D_9$ are obtained according to a fitted circle equation, the nine fitted circle diameters $D_1$, $D_2$, ..., $D_9$ are corrected to a rolling circle according to the contour curve lt' to obtain m rolling circle diameter values $D_1'$, $D_2'$, ..., $D_9'$, the rolling circle diameter values with large errors are eliminated, and then averaging is performed to obtain a first group of wheel diameter values D;

(5) steps (2) to (4) are repeated for a second group and a third group of images $P_{1-2}$ and $P_{2-2}$, and $P_{1-3}$ and $P_{2-3}$, and a second group and a third group of wheel rim height, rim thickness and diameter values are calculated; three groups of wheel rim height, rim thickness and diameter values are averaged to obtain final measured wheel rim height, rim thickness and diameter values;

(6) tread abrasion and peeling recognition: when there is no abrasion or peeling on a wheel set, all the profile structured light contours after the three-dimensional image reconstruction at three times are continuously slowly changing arcs, and when one of the profile structured light contours is abruptly changed, abrasion or peeling is judged depending on the type of abrupt change; and third step, real-time judgment alarm: differences are solved by comparing the wheel diameter, rim height and rim thickness values measured in the third step with standard values; it is judged whether an alarm prompt is required according to the diameter difference, the rim height difference and the rim thickness difference; it is judged whether an alarm prompt is required according to whether there is abrasion or peeling; when all the parameters do not exceed set values and there is no abrasion or peeling, it is considered that it is safe; and when one or more parameters exceed the set values or there is abrasion or peeling, it is determined that a system has a hidden danger, and an alarm is given.

It will be appreciated that in the first embodiment and the second embodiment, in order to measure a complete train wheel contour, a plurality of online measurement systems for multiple parameters of a wheel based on structured light may be arranged along the train forward direction, when the train passes through a detection area, the plurality of online measurement systems for multiple parameters of a wheel based on structured light sequentially takes images from different areas of the wheel, and after the wheel is rolled in the detection area for one circle, three-dimensional reconstruction and image stitching are performed on pictures of the plurality of online measurement systems for multiple parameters of a wheel based on structured light to obtain a complete train wheel contour.

The present invention has the beneficial effects that: the tread structured light unit 21 and the profile structured light unit 22 project a wheel profile contour and a tread contour on the wheel, two two-dimensional detectors take two images and perform three-dimensional reconstruction to obtain corresponding two parts of wheel tread and profile contour information, and wheel diameter, rim height and rim thickness can be obtained according to the two images. By taking multiple images by two or more two-dimensional image sensors 23, system reliability and measurement accuracy can be improved. A line laser is actively projected to form the wheel profile contour and the tread contour, which is less affected by the ambient light. The wheel diameter is solved according to two profile structured light contour fitting circles on the same circle, so that precise positioning for the wheel is not required.

The above embodiments are merely illustrative of two implementation manners of the present invention with specific and detailed description, and are not to be construed as limiting the patent scope of the present invention. It is to be noted that a number of variations and modifications may be made by those of ordinary skill in the art without departing from the conception of the present invention, and all fall within the scope of protection of the present invention. Therefore, the scope of protection of the present invention should be determined by the appended claims.

What is claimed is:

1. An online measurement method for multiple parameters of a wheel based on structured light, comprising the following steps:

first step, installation and calibration:
(1) installing an online measurement system for multiple parameters of a wheel based on structured light on a detection section,
the online measurement system for multiple parameters of a wheel based on structured light comprising:
a system controller, a wheel sensor, a first wheel online measurement device, and a second wheel online measurement device, wherein the wheel sensor, the first wheel online measurement device and the second wheel online measurement device are all connected to the system controller, and the wheel sensor, the first wheel online measurement device and the second wheel online measurement device are sequentially disposed side by side in a train forward direction;
both the first wheel online measurement device and the second wheel online measurement device comprise a tread structured light unit, a profile structured light unit and a two-dimensional image sensor, the profile structured light unit, the tread structured light unit and the two-dimensional image sensor being arranged along the outer side of the same steel rail;
the tread structured light unit emits n line lasers, where $n \geq 2$, and when the n line lasers are projected onto a wheel, n wheel tread contour curves are formed; the profile structured light unit emits m line lasers, where $m \geq 1$, and when the m line lasers are projected onto the wheel, m wheel profile contour curves are formed; the m wheel profile contour curves intersect with the n wheel tread contour curves in an area where a tread contour line is spaced apart from an inner side surface by 60-80 mm; and the n wheel tread contour curves and the m wheel profile contour curves are all within an imaging range of the two-dimensional image sensor;
(2) calibrating structured light parameters;

second step, train wheel parameter detection:
(1) obtaining measured train wheel contour information: when the train passes, after a wheel sensor detects a wheel, operating a first wheel online measurement device and a second wheel online measurement device simultaneously, denoting profile contours of m line lasers of profile structured light units of the first and second wheel online measurement devices on the wheel as $lp_{1-1}, lp_{1-2}, \ldots, lp_{1-m}, lp_{2-1}, lp_{2-2}, \ldots, lp_{2-m}$, denoting tread contours of $n_1$ line lasers of a tread structured light unit of the first wheel online measurement device on the wheel as $lt_{1-1}, lt_{1-2}, \ldots, lt_{1-n1}$, respectively, denoting tread contours of $n_2$ line lasers of a tread structured light unit of the second wheel online measurement device on the wheel as $lt_{2-1}, lt_{2-2}, \ldots, lt_{2-n2}$, respectively, and respectively taking, by two two-dimensional image sensors, contour images $P_{1-1}$ and $P_{2-1}, P_{1-2}$ and $P_{2-2}, \ldots, P_{1-k}$ and $P_{2-k}$ of two segments of profile structured light and tread structured light at the bottoms of k groups of wheels at k times, where k is a natural number;
(2) reconstructing a first group of three-dimensional contour images: performing three-dimensional image reconstruction on $P_{1-1}$ and $P_{2-1}$ according to images $P_{1-1}$ and $P_{2-1}$ taken by a first group of two two-dimensional image sensors and the structured light parameters calibrated in (2) of the first step to obtain three-dimensional reconstructed tread structured light contours $lt'_{1-1}$, $lt'_{1-2}, \ldots, lt'_{1-n1}, lt'_{2-1}, lt'_{2-2}, \ldots, lt'_{2-n2}$ and three-dimensional reconstructed profile structured light contours $lp'_{1-1}, lp'_{1-2}, \ldots, lp'_{1-m}, lp'_{2-1}, lp'_{2-2}, \ldots, lp'_{2-m}$;

(3) calculating a first group of measured wheel contour parameters: processing a first group of three-dimensional reconstructed tread structured light contours $lt'_{1-1}, lt'_{1-2}, \ldots, lt'_{1-n1}, lt'_{2-1}, lt'_{2-2}, \ldots, lt'_{2-n2}$ to synthesize a wheel tread curve $lt'$, and defining to calculate a first group of wheel rim height and rim thickness according to the tread curve $lt'$; or separately processing all $n_1+n_2$ reconstructed tread contours to obtain $n_1+n_2$ wheel rim height and rim thickness values, eliminating the rim height and rim thickness values with large errors, averaging the remaining wheel rim height and rim thickness values, and calculating the first group of wheel rim height and rim thickness;

(4) calculating a first group of measured wheel diameters: fitting m circles $C_1, C_2, \ldots, C_m$ according to m pairs of profile structured light contours $lp'_{1-1}$ and $lp'_{2-1}$, $lp'_{1-2}$ and $lp'_{2-2}, \ldots, lp'_{1-m}$ and $lp'_{2-m}$ after the first group of three-dimensional images is reconstructed, obtaining m diameters $D_1, D_2, \ldots, D_m$ according to a fitted circle equation, correcting the m fitted circle diameters $D_1, D_2, \ldots, D_m$ to a rolling circle according to the contour curve $lt'$ to obtain m rolling circle diameter values $D_1'$, $D_2', \ldots, D_m'$, eliminating the rolling circle diameter values with large errors, and then averaging to obtain a first group of wheel diameter values D;

(5) when k is greater than 1, repeating steps (2) to (4) for the remaining k−1 groups of images $P_{1-2}$ and $P_{2-2}, \ldots, P_{1-k}$ and $P_{2-k}$, calculating k−1 groups of wheel rim height, rim thickness and diameter values, eliminating the values with large errors for k groups of wheel rim height, rim thickness and diameter values, and then averaging to obtain final measured wheel rim height, rim thickness and diameter values;

(6) tread abrasion and peeling recognition: when there is no abrasion or peeling on a wheel set, setting all the profile structured light contours after the three-dimensional image reconstruction at k times to be continuously slowly changing arcs, and when one of the profile structured light contours is abruptly changed, judging abrasion or peeling depending on the type of abrupt change; and third step, real-time judgment alarm: solving differences by comparing the wheel diameter, rim height and rim thickness values measured in the second step with standard values; judging whether an alarm prompt is required according to the diameter difference, the rim height difference and the rim thickness difference; judging whether an alarm prompt is required according to whether there is abrasion or peeling; when all the parameters do not exceed set values and there is no abrasion or peeling, considering that it is safe; and when one or more parameters exceed the set values or there is abrasion or peeling, determining that a system has a hidden danger, and giving an alarm prompt.

2. The online measurement method for multiple parameters of a wheel based on structured light according to claim 1, wherein in the first step, the detection section is provided with a plurality of online measurement systems for multiple parameters of a wheel based on structured light, when the train passes through a detection area, the plurality of online measurement systems for multiple parameters of a wheel based on structured light sequentially takes images from different areas of the wheel, and after the wheel is rolled in the detection area for one circle, three-dimensional reconstruction and image stitching are performed on pictures of the plurality of online measurement systems for multiple parameters of a wheel based on structured light to obtain a complete train wheel contour.

* * * * *